May 2, 1950     I. H. BULLOCK     2,506,341
CORE BIT
Filed Oct. 28, 1948
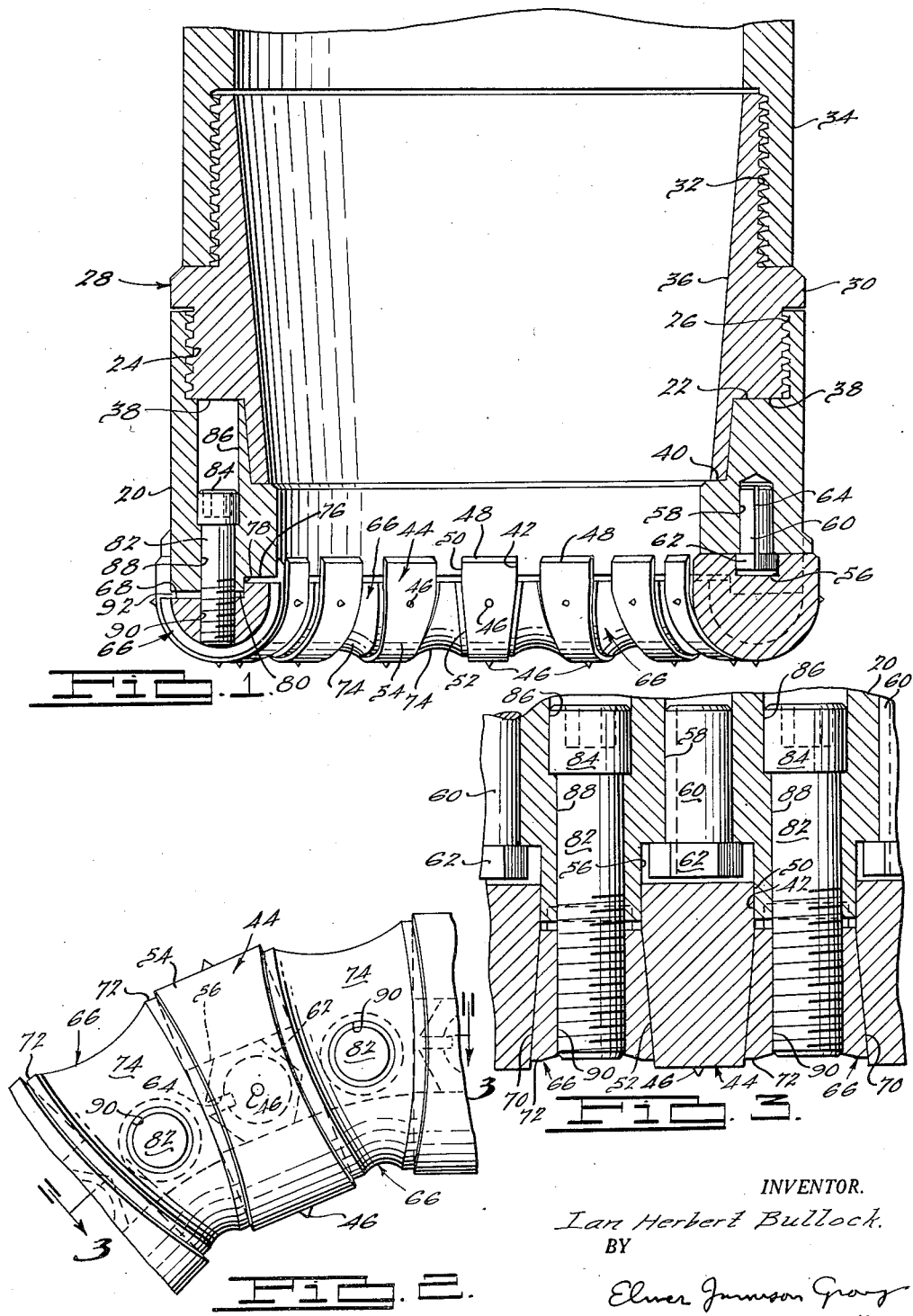
INVENTOR.
*Ian Herbert Bullock.*
BY
*Elmer Johnson Gray*
ATTORNEY.

Patented May 2, 1950

2,506,341

UNITED STATES PATENT OFFICE 2,506,341

CORE BIT

Ian Herbert Bullock, Detroit, Mich., assignor to Koebel Diamond Tool Co., Detroit, Mich., a corporation of Michigan Application October 28, 1948, Serial No. 57,063

2 Claims. (Cl. 255—72)

This invention relates to drill bits or similar tools useful, for example, in drilling into hard earth strata, such as packed or consolidated sand, rock formations, sandstone and the like. The invention is especially applicable to drilling tools commonly known as core bits which are employed widely in coring operations when drilling for oil or for other purposes where it is desired, for example, to make soundings in order to obtain specimens of earth formations for geological analysis.

Core bits employed in coring wells are frequently equipped with diamonds in order to increase the drilling rate and prolong the life of the bits. In the case of diamond core bits the diamonds are usually set in a matrix formed, for example, of sintered powdered or comminuted metal. This matrix or slug is permanently secured as by brazing to the body of the core bit which in turn is threaded for attachment to the core barrel. Since the core bits are subjected to extremely hard usage, wear and shocks during the drilling operations, the cutting portions thereof often become fractured, chipped, broken or otherwise damaged, making it usually necessary to replace the entire core bit. The damaged core bit can seldom be usefully repaired after being withdrawn from the well or hole being cored out. Hence, the bit is usually scrapped, even though only a portion thereof is damaged and the remainder is in useful condition. The relatively high cost of the core bits, especially diamond core bits, greatly increases the cost of drilling operations as a result of the necessity of scrapping the entire core bit whenever damage thereto of such nature occurs as to render the bit inoperative or ineffectual for efficient coring work.

One of the chief objects of the invention is to overcome the foregoing disadvantages by providing a bit which is not only efficient in carrying out the work required of it but which may be readily repaired or renewed as to usefulness when only partially damaged or worn.

Another important object of the present invention is to provide a drill bit of improved construction having cutting portions or members which may be removed and replaced, thereby prolonging the life of the bit as a whole, reducing greatly the overall cost thereof, and as a consequence reducing the cost of drilling operations.

A further object of the invention is to provide a core bit having a tubular body adapted at one end to receive a plurality of drill members detachably mounted thereto, said body having a threaded extension at its opposite end for attachment to a tubular adaptor which in turn is attachable to the end of a core barrel, there being an annular shoulder on the body at the base of said threaded extension which is covered or overlapped by a portion of the adaptor, and the attaching means for the drill members including threaded devices extending through a portion of the body and accessible for operation at said shoulder when the core bit is detached from the adaptor.

Another object of the invention is to provide a core bit comprising an annular body having radial slots or recesses for the reception of drill inserts and means or devices for firmly and rigidly clamping the inserts in position against dislodgement during operation, said drill inserts and clamping devices being preferably removable and replaceable in order to prolong the life of the core bit.

Other and more specific objects of the invention are to provide a core bit of the foregoing character and having improved means for detachably securing the clamping devices to the core bit body whereby said securing means are shielded from the abrasive action of the drilling operation; to provide such a core bit wherein the clamping means for the detachable inserts include screw threaded bolt means having their heads protected within the body of the core bit and accessible from the end thereof which is connected to the core barrel upon detachment of the latter from the core bit; and to provide such a core bit which is removably connected to the core barrel by an adaptor means, whereby operative portions of the securing means for the detachable drill inserts, which effect the detachable securing engagement between the securing means and the drill inserts, are shielded by the adaptor when the latter is in operative position with the core bit, and whereby attachment between core bits and core barrels of various sizes and types is also permitted.

Still another object is to provide a drill construction of the character described which is of simplified construction and design, thereby achieving optimum economy in manufacture and maintenance and permitting repairs and replacement of parts with a minimum of expense and lost time.

Other objects of this invention will appear in the following description and appended claims, reference being had to the accompanying drawings forming a part of this specification wherein like reference characters designate corresponding parts in the several views.

Fig. 1 is a fragmentary axial section showing a core bit and adaptor embodying the present invention and installed on the lower end of a core barrel.

Fig. 2 is a fragmentary enlarged bottom view of the core bit shown in Fig. 1.

Fig. 3 is a fragmentary enlarged axial section taken substantially in the direction of the radial arrows along the circumferential line 3—3 of Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention is illustrated by way of example in application with a core bit, preferably of the diamond type, wherein the cutting or drill elements are mounted around the lower end of an annular or tubular supporting body which in turn is detachably connected to the lower end of the usual core barrel by means of a concentric annular adaptor. During a drilling operation, the core barrel with the attached adaptor and bit are rotated about their longitudinal axis at a suitable speed, such as between 100 R. P. M. and 150 R. P. M. The core bit cuts a generally circular hole and at the same time separates from the earth a central core which is forced upwardly through the bit and barrel as the drilling operation proceeds.

It is important that the core bit be made rugged and strong so as to enable the same to cut the maximum possible depth before replacement becomes necessary due to wear, and further that the construction of the bit be such as to ensure the formation of an unbroken core. Heretofore, it has been the practice to secure the core bit cutting elements permanently and solidly to the body of the bit, as by brazing, thereby to assure the production of a bit having the greatest possible strength. As pointed out above, such a construction precludes repair of the bit in a great many instances where damage to the bit has been only of a partial nature. In accordance with the present invention the drill or cutting elements of the bit are made separable from the body, yet means are provided of such character as to enable the cutting elements to be so rigidly wedged or clamped to the body as to render the structure in effect substantially a solid unit having as high a degree of strength and ruggedness as heretofore.

Referring to the drawings, the core bit therein shown comprises an annular body 20 provided with an annular interior shoulder 22 extending from the base of an interiorly threaded extension 24. This extension is adapted to be screwed into an exteriorly threaded portion 26 of a cylindrical adaptor indicated generally by the numeral 28. The adaptor 28 is provided with an annular shoulder 30, adapted to overlie the upper threaded end 24 of the core bit, and also is provided with a reduced exteriorly tapped upper portion 32 adapted to be threaded into the lower tapped end of a conventional core barrel 34.

As illustrated in Fig. 1, the adaptor 28 is formed with an internal tapering wall 36 which converges axially toward the lower end of the body 20 of the core bit assembly. In accordance with usual practice, there is mounted during use within the adaptor 28 a tapered split ring known as a core catcher (not shown) which is provided with a number of internal ribs or dogs adapted to grab the core when the split ring is pushed downwardly into the tapered interior wall 36. It will be understood that during the coring operation, the core slides freely through the core catcher, but when the core bit assembly is pulled off bottom or drawn upwardly, the core catcher is forced down into the tapered wall 36 causing the aforesaid ribs or dogs to tighten around the core.

At the base of the screw threaded portion 26, the body of the adaptor 28 provides an external annular shoulder 38 which is adapted to seat tightly against the shoulder 22 of the core bit when the latter is screwed in the operative position on the adaptor 28. Likewise, in the assembled position, the base of the tapered wall 36 extends below the shoulder 22 and rests on an annular shoulder 40 provided interiorly on the core bit body 20. Thus, for a purpose which will be made apparent below, when the adaptor 28 and core bit 20 are assembled, the sidewalls thereof cooperate to enclose the interior shoulder 22 and shield the same from dirt and abrasion that would otherwise result from a drilling operation.

The body of the core bit 20 terminates below the tapered inner wall 36 in an annular opening and is machined at its lower annular edge to provide a number of equally spaced radially extending slots 42 for the reception of a corresponding number of drill inserts or cutting elements 44. Each insert 44 may be formed from a matrix of sintered powdered or comminuted metal alloy having a number of protruding diamonds 46 set in the outer surface thereof in accordance with conventional practice. Although only a few protruding diamonds 46 are shown for each insert 44, it will be understood that this is merely for illustration, since a large number of diamonds 46 are ordinarily set in the face of each drill insert 44 to provide the required cutting surface.

Each drill insert 44 is formed in the present instance with an upper head portion chamfered at 48 at the interior and exterior edges and having parallel axially extending side surfaces 50 corresponding in depth substantially to the depth of the slots 42 and dimensioned so as to fit snugly thereinto. Starting from the base of the head of each insert 44, the sides are tapered at 52 so as to converge downwardly, each side being preferably formed on a taper of approximately five degrees. The cutting face 54 of each insert 44 is generally arcuate in shape in a radial direction at its lower end and is generally vertical at the inner and outer upper edges. The head of each insert 44 is machined to provide a central transverse or circumferentially extending slot or keyway 56 having parallel rectangular sides, Figs. 1 and 3.

Also as illustrated in Figs. 1 and 3, the body 20 is drilled axially through the base of each slot 42 to provide a cylindrical hole 58 for the reception of the shank of a dowel pin or adjusting stud 60 which has a slip fit within the hole 58. The pin or stud 60 terminates in a hexagon head 62, Fig. 2, dimensioned to fit snugly within the slot 56. Since the shank of the pin or stud 60 has a snug fit within the hole 58, it is desirable to machine an air bleed groove 64 in the length of the pin 60.

From the foregoing it will be seen that each drill insert or cutting element 44 has a rectangular sided upper head portion adapted to fit snugly in any one of the radial slots 42 in the body 20 and has a transverse keyway or slot 56 at its upper end within which the hexagon head 62 of the pin 60 is keyed. The slot 56 does not key the head 62 against movement lengthwise of the slot 56, i. e. circumferentially. However, by virtue of the snug fit of the head 62 within the slot 56, displacement of the drill insert 44 in a radial direction is prevented.

The several drill inserts 44 are rigidly held in position on the lower end of the core bit body 20 by means of a corresponding number of clamping devices 66, each being wedged shaped in two directions. Referring to the drawings, it will be seen that each clamp 66 has a flat upper face 68, Fig. 1, and tapering side walls 70 which diverge downward and radially outward.

Corresponding to the taper of the side wall 52 of the drill insert 44, the taper of each side wall 70 is also preferably approximately five degrees. I prefer to use a taper of five degrees but not exceeding seven degrees so that when the clamp 66 is driven or wedged in between adjacent drill inserts 44, the engagement of the corresponding tapered surfaces of the clamp and inserts will be of a binding nature preventing any tendency of the clamps 66 or inserts 44 to loosen during operation.

Each clamp 66 terminates downwardly in a generally arcuate edge 72 and is provided with a concave relief 74 extending between the edges 72 from the inner end to the outer end. It will be noted that the lower ends of the drill inserts 44 protrude well below the lower marginal edges 72 of the clamp 66. By relieving the faces of the clamps at 74, water courses of substantial depth are provided between adjacent drill inserts. Similar vertical grooved water courses (not shown) may be spaced circumferentially around the lower outer periphery of the core bit 20, if desired, so as to communicate with the grooves 74. Thus water or other liquid pumped down the core barrel 34, adaptor 28 and core bit 20 may flow outwardly through these water courses.

As illustrated in Fig. 1 an annular groove or step 76 is machined around the inner portion of the end face of the body 20, thereby providing a continuous annular shoulder 78 adapted to abut the heel 80 which projects upwardly from the inner or narrow end of the clamp 66 when the latter is installed in its clamping position. Thus positive means are provided to prevent radial outward displacement of the clamp 66. In addition, each clamp 66 is secured in position by means of a screw 82 having a threaded shank and terminating at its upper end in a head 84 within the counter bore 86 which extends axially downward from the shoulder 22 into the body 20. A hole 88 of reduced diameter is bored axially through the body 20 from the base of the counter bore 86, leaving at the base of the latter a shoulder portion engaged by the head 84 to prevent the same from passing through the hole 88. The lower end of the hole 88 is adapted to align with a tapped hole 90 extending axially into the clamp 66 from the upper plane surface 68 and into which the shank of the screw 82 is screwed.

Prior to mounting the core bit 20 on the adaptor 28, the screws 82 are inserted into their corresponding counterbores 86, with each threaded shank projecting from the body 20 so as to be threaded into the tapped hole 90 therefor within the respective clamp 66. When the inserts 44 are interposed between the clamps 66, the latter are drawn tightly against the body 20 of the core bit by tightening the screws 82. Thus the clamps 66 and inserts 44 are rigidly locked to the body 20 by virtue of the interengagement of the tapered walls 72 and 70. Sufficient clearance 92 is allowed between the upper surfaces of the clamps 66 and the adjacent under surfaces of the core bit body 20 to ensure drawing of the clamps 66 upward to a maximum depth permitted by the drill inserts 44 upon tightening the screws 82.

In the illustrated embodiment the drill inserts 44 are preferably adjustable radially so as to compensate for wear occurring during the drilling operation. This is accomplished by forming the hexagonal head 62 asymmetrically with respect to the axis of the shaft of the stud 60, enabling the latter to be turned to any one of six indexed positions so as to dispose the insert 44 in a desired radial position with respect to the body 20. Adjustment of the drill inserts 44 may be accomplished by unscrewing the core bit body 20 from the adaptor 28 and thereafter removing the clamps 66 at opposite sides of the insert 44. The latter is then removed to permit the stud or dowel pin 60 to be turned to the desired position of adjustment, after which the parts are assembled in the manner shown in the drawings. Since the radial adjusting means for the drill inserts forms no part of the present invention, a further description thereof is deemed unnecessary, the same being shown and described in a copending application Ser. No. 788,754.

With the drill inserts 44 rigidly clamped in assembled relation by means of the clamping devices 66, it will be seen that each drill insert 44 will be held in fixed position against any possibility of displacement in any direction. The insert 44 is held within its slot 42 against circumferential displacement. Engagement of the tapering side walls 52 of the drill insert 44 with the corresponding side walls 70 of the clamp 66, in conjunction with the screws 82, prevents axial displacement of the inserts 44. Engagement of the heel 80 on each clamp 66 with the abutment shoulder 78 will prevent outward radial displacement of the clamp 66, thus relieving the shear load on the screw 82. Displacement of the drill inserts 44 in either radial direction is also blocked by the head 62 keyed within the slot 56.

By the structure described, it is apparent that the drill inserts 44 are detachably secured to the body 20 by securing means (including the clamps 66) having operative portions or means, i. e. the screws 82 in the present instance, extending through the body 20 and being accessible at the upper portions of the latter to permit selective tightening or loosening of the clamping engagement between the clamps 66 and inserts 44. In this connection, it is to be observed that the lower ends of the aforesaid operative means or screws 82 preferably do not project below the recessed faces 74 of the clamping members 66. The heads 84 of the screws 82 may be of the socket type so as to receive an Allen type wrench, for example, and are protected by the cooperating wall portions of the assembled body 20 and adaptor 28 during the drilling operation against abrasion and deformation which would otherwise render removal of the inserts 44 difficult. Further, by virtue of the adaptor 28, an operative connection between core bits and core barrels of various sizes and types is readily permitted.

Although the embodiment of the present invention described by way of example herein employs a clamp type securing means having the screw type operative means 82 for selectively tightening or loosening the clamps 66 from the inserts 44, it is apparent that other types of securing means may be employed within the spirit of the present invention for detachably securing a plurality of drill inserts to a core bit body and having other operating means accessible at the shielded portions of the body 20, upon loosening or removing the adaptor 28, for selectively effecting the securing engagement with the drill inserts.

I claim:

1. In a core bit, the combination of a tubular body adapted to receive a plurality of drill members detachably mountable thereto at one end, means for detachably connecting said body to a core barrel and including an adaptor detachably connected to said body at the other end of the latter, said body having portions adapted to be substantially covered by said adaptor when the latter is operatively connected to said body, clamping devices engageable with said members for detachably clamping the same to said body, and screw threaded means engaged with said devices for releasably drawing the same toward said body upon being tightened and being extended from said devices through said body to said portions to permit tightening or loosening thereat.

2. In a core bit, the combination of a tubular body adapted to receive a plurality of drill members detachably mounted annularly on one end thereof, means for detachably connecting said body with a core barrel and including an adaptor detachably secured to said body at the other end thereof, annularly disposed interior shoulder portions on said body, cooperating wall portions of said body and adaptor for enclosing said shoulder portions when said body and adaptor are operatively secured, clamping devices engageable with said drill members for detachably clamping the latter to said body, and screw threaded means engaged with said devices for releasably drawing the latter toward said body in clamping engagement with said members and being extended through said body to said shoulder portions to be tightened or loosened thereat.

IAN HERBERT BULLOCK.

REFERENCES CITED

The following references are of record in the file of this patent:

UNITED STATES PATENTS

| Number | Name | Date |
|---|---|---|
| 1,224,509 | Smith | May 1, 1917 |
| 1,468,774 | Caldwell | Sept. 25, 1923 |
| 1,519,641 | Thompson | Dec. 16, 1924 |
| 1,542,172 | Reed et al. | June 16, 1925 |
| 2,182,562 | Koebel | Dec. 5, 1939 |
| 2,326,908 | Williams | Aug. 17, 1943 |